(12) United States Patent
Laurent et al.

(10) Patent No.: US 12,476,942 B2
(45) Date of Patent: Nov. 18, 2025

(54) METHOD AND DEVICE FOR TRANSMITTING OR EXCHANGING ANONYMOUS INFORMATION WITHIN A TRUSTED NETWORK

(71) Applicant: COMMISSARIAT A L'ENERGIE ATOMIQUE ET AUX ENERGIES ALTERNATIVES, Paris (FR)

(72) Inventors: Frédéric Laurent, Jouy-en-Josas (FR); Alexis Olivereau, Orsay (FR); Baptiste Polve, Champlan (FR)

(73) Assignee: COMMISSARIAT A L'ENERGIE ATOMIQUE ET AUX ENERGIES ALTERNATIVES, Paris (FR)

(*) Notice: Subject to any disclaimer, the term of this patent is extended or adjusted under 35 U.S.C. 154(b) by 0 days.

(21) Appl. No.: 18/274,226

(22) PCT Filed: Jan. 26, 2022

(86) PCT No.: PCT/EP2022/051691
§ 371 (c)(1),
(2) Date: Jul. 26, 2023

(87) PCT Pub. No.: WO2022/167275
PCT Pub. Date: Aug. 11, 2022

(65) Prior Publication Data
US 2024/0080304 A1    Mar. 7, 2024

(30) Foreign Application Priority Data
Feb. 4, 2021 (FR) .................................... 2101055

(51) Int. Cl.
*H04L 29/06* (2006.01)
*G06F 21/62* (2013.01)
*H04L 9/40* (2022.01)

(52) U.S. Cl.
CPC ...... *H04L 63/0421* (2013.01); *G06F 21/6254* (2013.01)

(58) Field of Classification Search
CPC ............ H04L 63/0421; H04L 63/0407; G06F 21/6254; H04W 12/02
See application file for complete search history.

(56) References Cited

U.S. PATENT DOCUMENTS

2007/0223690 A1*   9/2007   Golle .................. B42D 15/025
                                                                  380/55
2013/0232198 A1   9/2013   Tenbrock
(Continued)

FOREIGN PATENT DOCUMENTS

EP         2 924 620 A1     9/2015
WO     2019/072470 A1     4/2019

OTHER PUBLICATIONS

Zave et al., "A Verified Session Protocol for Dynamic Service Chaining", IEEE/ACM Transactions on Networking, vol. 29, No. 1, Feb. 2021.*
(Continued)

*Primary Examiner* — Morshed Mehedi
(74) *Attorney, Agent, or Firm* — BakerHostetler (57) ABSTRACT

A device and a method for the anonymous transmission of information, the transmission being a point-to-multipoint communication or a multipoint-to-multipoint communication between members of one and the same trusted network, a trusted network being predefined by a plurality of members and a plurality of independent proxies, the communication within a trusted network taking place on an anonymization network platform that masks the IP addresses of the members of the trusted network, the method being computer-implemented and comprising steps of: a member of a trusted network, comprising N' members and N proxies, generating a plurality N of complementary data fragments, from an initial data packet, such that recombining the N complementary fragments makes it possible to reconstruct the initial data packet; the sending member transmitting, via (Continued)

the anonymization network platform, each generated complementary fragment to an independent proxy from among the N proxies, respectively; each independent proxy retransmitting, via the anonymization network platform, the complementary fragment received from the sending member to the plurality N' of members of the trusted network; and each receiving member of the trusted network recombining the plurality N of received complementary fragments in order to reconstruct the initial data packet.

16 Claims, 10 Drawing Sheets

(56) References Cited

U.S. PATENT DOCUMENTS

| | | | |
|---|---|---|---|
| 2015/0381752 A1* | 12/2015 | Torres | H04L 69/326 |
| | | | 709/228 |
| 2016/0219024 A1* | 7/2016 | Verzun | H04L 9/34 |
| 2019/0044916 A1 | 2/2019 | Jones | |
| 2020/0076772 A1 | 3/2020 | Kapp et al. | |
| 2024/0114014 A1* | 4/2024 | Pinheiro | H04L 47/122 |

OTHER PUBLICATIONS

Chan, et al., "DAISY: Increasing Scalability and Robustness of Anonymity Systems", Department of Computer Sciences Purdue University.

* cited by examiner

METHOD AND DEVICE FOR TRANSMITTING OR EXCHANGING ANONYMOUS INFORMATION WITHIN A TRUSTED NETWORK

CROSS-REFERENCE TO RELATED APPLICATIONS

This application is a National Stage of International patent application PCT/EP2022/051691, filed on Jan. 26, 2022, which claims priority to foreign French patent application No. FR 2101055, filed on Feb. 4, 2021, the disclosures of which are incorporated by reference in their entireties.

FIELD OF THE INVENTION

The invention is in the technical field of communication protocols, and relates more particularly to a method for the unidirectional anonymous transmission or the bidirectional anonymous exchange of information within a network of partners, anonymously and securely without any trusted third parties, while preserving the anonymity of the one or more senders.

BACKGROUND

Network-level anonymization is presently in a highly embryonic state. Current known solutions, that is to say the use of a virtual private network (VPN) or the Tor ("The Onion Router") overlay network or else the anonymous I2P ("Invisible Internet Project") network, are all based on a "trusted third party" that, by design, sees all uplink and downlink traffic exchanged between the end-points of the communication.

Patent application WO/2019/072470A1 provides a solution to this problem by introducing two complementary concepts—the asymmetry of the uplink and downlink routes at the exit of the exchange platform and the channeling of anonymous noise to all of the intermediate nodes of a given route—by virtue of which no one element of the platform is in possession of all of the content. However, this architecture allows only anonymized and secure point-to-point communication, and it does not allow point-to-multipoint or multipoint-to-multipoint communication (that is to say a transmission or an exchange).

There is also an emerging need, which is not satisfied, to allow exchanges on trusted networks for anonymous exchanges between partners sharing certain common needs but who, for various reasons (for example regulatory, competition, image preservation, legal risks), do not wish to communicate this information directly to one another.

Therefore, in light of the emerging needs and existing drawbacks, communications within the framework of trusted networks should have the following properties:
  allowing the rapid (or even quasi-real-time) unidirectional or bidirectional dissemination of information to the members of the trusted network (also called "trusted group") or to the members of subgroups (also called "circles of trust") of this network;
  guaranteeing that only the members of the trusted group will receive the information and that, therefore, no third party outside the group is able to access this information. This means that there is no trusted third party able: (1) to break the anonymity of the sender of any given information; (2) to access or modify this information, independently of the level of protection (typically by encryption) intrinsic to this information; (3) to ascertain that a datum has been sent according to a variation in which a noise generation system has been implemented;
  allowing, in a particular variation referred to as "guarantee", the members of the network to be able to individually carry out this guarantee, that is to say that a member does not need to trust the other members to benefit from this guarantee;
  allowing the one or more receivers to qualify the information through a degree of trust while its sender is (and must remain) unknown;
  offering each member of the network the possibility to monitor (that is to say verify) the members of the network in real time, and thus avoid an association between multiple members aimed at excluding one or more other members from certain transmissions or certain exchanges or aimed at breaking the anonymity of certain members or at intercepting or modifying some of the transmissions or exchanges.

However, there is at present no solution for covering all of these needs, including that of allowing each member of a network to monitor the other members of the network in real time, in particular in a low-latency communication context. The following approaches propose partial solutions:

"Freenet" is a decentralized "peer-to-peer" (P2P) platform allowing censorship-"resistant" communications. In practice, it is an information sharing service that allows an individual A to broadcast information, making it difficult to intercept and delete said information through the distribution of encrypted blocks to certain members of the Freenet network, who will effectively be responsible for storing same and retransmitting same on request. Each block is duplicated with multiple users, thus making it difficult to censor the information that it contains. The information is then accessible via a link that will allow the various blocks to be accessed and reassembled. Freenet is not anonymous per se, but combined with Tor, it makes it possible to disseminate information anonymously to a large number of destinations. Freenet cannot guarantee access to the datum just to partners. Indeed, anyone in possession of the link will be able to access the information. Conceptually, Freenet is therefore more of a shared, distributed and persistent storage means than a low-latency transmission means.

"Zeronet" is a P2P information exchange network, conceptually similar to Freenet but based on more modern technologies (blockchain and BitTorrent). The main difference lies in the fact that copies of the information are stored only with those who have consulted the information, and not potentially by all members of the P2P network. Therefore, Zeronet has the same limitations as Freenet with regard to the need.

Previous publications relating to anonymous multicast have described mechanisms for masking the control center of a network from an attacker (which is nowadays adopted for Botnets), but the information only goes in one direction, because only the head of the network controls it.

The DAISY anonymization system, described in the article by Chan, Chi-Bun, and Cristina Nita-Rotaru, "DAISY: Increasing Scalability and Robustness of Anonymity Systems.", is based on a 3-level architecture in which a central core of routers ("Core Delegate Network") aims to complicate the correlation between the inputs and outputs of the anonymization system. However, the description of DAISY specifies that this solution cannot currently enable anonymous group communications.

Tor hidden services may also be likened to an anonymous broadcast service, provided that the hidden service also implements access control. For example, the ICIJ "International Consortium of Investigative Journalists" uses SecureDrop, which is a Tor hidden service, to receive information from whistleblowers and disseminate it to all of its journalists. However, this hidden service is, by design, a trusted third party because it will be the focal point of the information disseminated between the members of the network. It is the only entity to control the dissemination to the members of the network of partners, and may therefore "choose" to restrict the dissemination of information to one or more members of the network of partners. It sees all incoming and outgoing flows, and is therefore able in theory to access or modify the content thereof.

Moreover, it is an intrinsically unidirectional system, which requires management on the application layer to make it bidirectional.

Moreover, like the other solutions mentioned above, a Tor hidden service does not make it possible:

- to guarantee that the information is effectively disseminated just to the members of the network, even if an access control mechanism is added to the service;
- to offer each member of the network the possibility to monitor (that is to say verify) the members of the network in real time (and thus to avoid an association of multiple members aimed at excluding one or more members from certain transmissions or certain exchanges);
- to guarantee that the transmitted or exchanged information cannot be intercepted and/or modified by a third party able to carry out sophisticated attacks against current and future end-to-end encryption techniques;
- to natively allow the construction of various circles of trust within the network of members;
- to allow the possibility of hiding the event of sending a payload message.

The present invention addresses these various needs.

SUMMARY OF THE INVENTION

One aim of the present invention is to propose an architecture and a mechanism for the low-latency point-to-multipoint or multipoint-to-multipoint anonymous transmission of information. The transmission is anonymized, secure and free from trusted third parties. The invention makes it possible to establish completely anonymous trusted networks for the unidirectional anonymous transmission or the bidirectional anonymous exchange of information.

Advantageously, the present invention aims to allow the exchange of information between partners, within a trusted network, in a truly anonymized and secure manner and free from trusted third parties.

According to various embodiments, the invention also makes it possible:

- to guarantee to the members of the network that no third party outside the network is able to access or modify the information that is transferred;
- to guarantee to the members of the network that no collusion by a subgroup of members is taking place against one or more other members;
- to establish trusted groups or circles of trust having different levels of trust, in order to qualify the degree of trust of the anonymous information received by the receivers.

Generally speaking, the method of the invention is based on an architecture comprising a network anonymization solution (in practice, this may be an overlay network of an underlying standard communication network); a set or group or circle of partners wishing to exchange information with one another anonymously; and a set (or "pool") of proxies operated by independent parties, these parties possibly being partners of the group, and responsible for relaying information from a sender of the group of partners to the other partners of the group.

Advantageously, the present invention introduces a new communication mode that does not exist at present, called "anonymous multicast" communication mode, that is to say giving the possibility of quickly broadcasting, unidirectionally or bidirectionally, information within a trusted group, without any of the receivers being able to determine the sender of this information, and also without any other entity (typically a "trusted third party", but also a third party outside the trusted network) being able to carry out this determination.

The fields of industrial application for the invention are manifold, such as the fields of energy, transport and banking, to name but a few, but cover, without limitation, solutions implementing any single-level or multi-level trusted network for the anonymous exchange of data, including notably:

- a trusted network for the exchange of information in order to speed up the detection of bank fraud, by way of payment or insurance;
- a trusted network for the exchange of information about cyber attacks;
- a trusted network for the exchange of information between state intelligence services;
- a trusted network for the exchange of information between journalists;
- a trusted network for the exchange of confidential business information (for example about suppliers) between business partners.

In one variant embodiment, the present invention makes it possible to create an anonymous instant messaging architecture, which must remain compatible with obligations in terms of legal interception.

To obtain the desired results, what is proposed is a method for the anonymous transmission of information, the transmission being a point-to-multipoint communication or a multipoint-to-multipoint communication between members of one and the same trusted network, a trusted network being predefined by a plurality of members and a plurality of independent proxies, the communication within a trusted network taking place on an anonymization network platform that masks the IP addresses of the members of said trusted network. The method is computer-implemented and comprises steps of:

- from a member of a trusted network, comprising N' members and N proxies, generating a plurality N of complementary data fragments, from an initial data packet, such that recombining the N complementary fragments makes it possible to reconstruct the initial data packet;
- said sending member transmitting, via the anonymization network platform, each generated complementary fragment to an independent proxy from among the N proxies, respectively;
- each independent proxy retransmitting, via the anonymization network platform, the complementary fragment received from said sending member to the plurality N' of members of the trusted network; and each receiving member of the trusted network recombining the plurality N of received complementary fragments in order to reconstruct the initial data packet.

The invention may be implemented in accordance with alternative or combined embodiments, in which:

the method may comprise an initial step of defining, from among the plurality N' of members of the trusted network, at least three receiving members, and/or of defining, from among the plurality N of independent proxies, at least two proxies for relaying the transmission of the complementary fragments to the receiving members.

the step of generating a plurality N of complementary fragments may consist in applying a shared-secret function F( ) to said initial data packet, and the step of recombining the plurality N of received complementary fragments consists in applying the inverse shared-secret function $F^{-1}$( ) to said complementary fragments.

the shared-secret function may for example be an XOR function with or without latency.

the step of generating a plurality N of complementary fragments may consist in generating N−1 random fragments of a length equal to the length of the initial data packet, and in which the last fragment N is a fragment complementary to the previous ones.

the initial step may further comprise a step of defining a shared-secret function F( ) for a subset of the plurality N' of members of the trusted network.

the step of the sending member transmitting the complementary fragments may also include, at the same time or sequentially, transmitting the shared-secret function to each proxy, or may directly include the function of reassembly via the complementary fragments.

the method may further comprise, after the recombination step, at least one receiving member of the trusted network implementing the generation, transmission, retransmission and recombination steps of the anonymous transmission method in order to send an anonymous response to said anonymous sending member.

the retransmission step performed by the proxies may consist in at least two proxies retransmitting their received complementary fragment to a subset of the plurality of receiving members.

the step of transmitting the complementary fragments to the proxies may consist in transmitting, in addition to the complementary fragments, data or random fragments devoid of meaning and recognized as noise at the application level.

the method may comprise, prior to the step of the proxies retransmitting the received complementary fragments, a step of the proxies storing said received complementary fragments.

the step of the proxies retransmitting the complementary fragments may further comprise a step consisting, for each proxy, in notifying the transmission of the complementary fragment to a member of the trusted network in charge of access to the anonymization network platform, said notification possibly being a message including information relating to the performance of the transmission, notably information relating to the size, to the data rate, and to the unidirectional or bidirectional nature of the data packet.

the method may further comprise, after the fragment recombination step, a step of generating a grading of the received data packet.

one, several or all of the proxies may be hosted by one or more members of the trusted network.

The invention also relates to a device for the anonymous transmission of information, the transmission being a point-to-multipoint communication or a multipoint-to-multipoint communication between members of one and the same trusted network, a trusted network being predefined by a plurality of members and a plurality of independent proxies, the communication within a trusted network taking place on an anonymization network platform that masks the IP addresses of the members of said trusted network, the device comprising means for implementing the steps of the method of the invention.

The invention also relates to a computer program product that comprises code instructions for carrying out the steps of the method of the invention when the program is executed on a computer.

BRIEF DESCRIPTION OF THE DRAWINGS

Other features and advantages of the invention will become apparent with the aid of the following description and the figures of the appended drawings, in which:

FIG. 4a and

FIG. 5a and

FIG. 7a and

DETAILED DESCRIPTION

Figure 1:
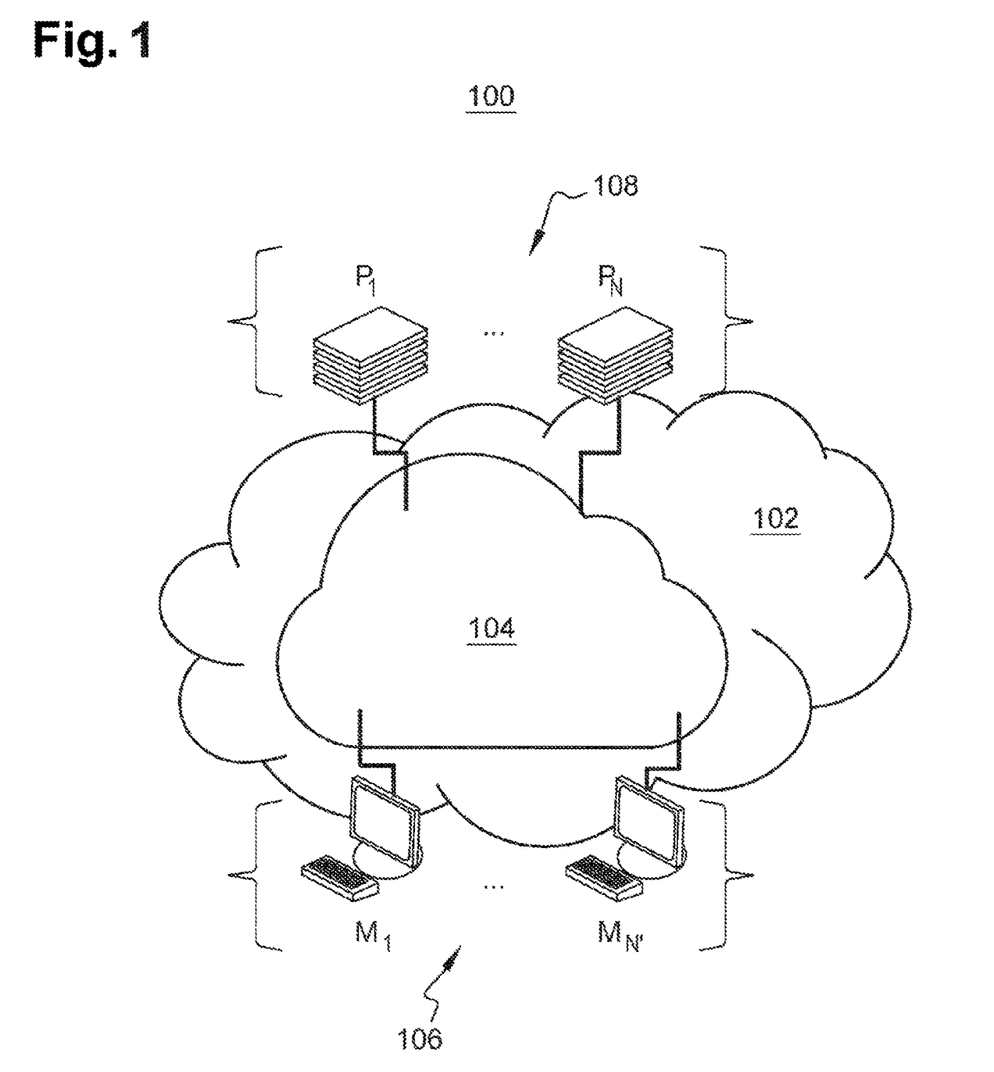
FIG. 1 illustrates, in simplified form, an environment for implementing the present invention.

The context 100 for an implementation of the invention is illustrated in simplified form in FIG. 1, comprising a communication network 102 on which there is a network anonymization solution 104. In one embodiment, the network anonymization solution 104 is an anonymization network covering the underlying traditional communication network 102.

Advantageously, the anonymization solution 104 does not necessarily have to have highly sophisticated anonymization properties. Nevertheless, the level of anonymity offered by the invention is partly dependent on the robustness of the network anonymization solution. A simple VPN anonymization service is thus not advised, and those skilled in the art will preferably implement the invention via anonymization networks such as Tor, I2P or preferably using a platform based on the architecture of the abovementioned patent application WO2019/072470A1 from the Applicant.

The architecture for implementing the method of the invention also comprises a network 106 of N' partners ($M_1$ to $M_{N'}$) wishing to exchange information with one another anonymously, and a pool of N independent proxies 108 ($P_1$ to $P_N$).

The proxies and the members of the trusted network (that is to say the partners) have network addresses (for example IP addresses) of the underlying traditional network 102.

The proxies are responsible for relaying information from a sending member to the partners or recipients of the trusted network 104. The proxies are not able to ascertain and determine whether or not the data that they carry are payload data.

Figure 2:
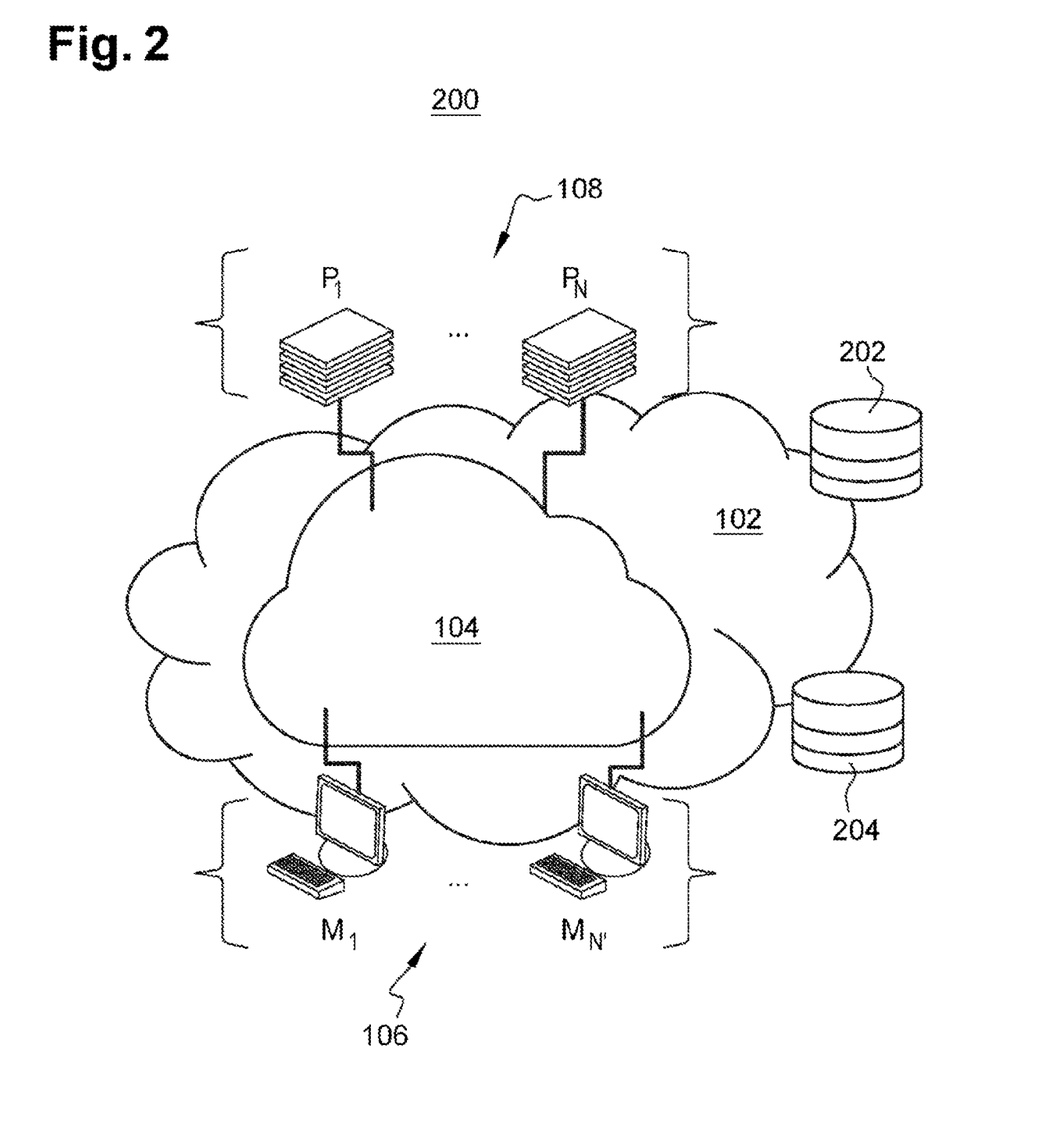
FIG. 2 illustrates one embodiment of an architecture of the invention.

FIG. 2 illustrates one implementation 200 of the invention in the context 100 of FIG. 1. Although a traditional communication network 102 is shown, the latter does not participate in implementing the method of the invention, in which communications take place only via the anonymization network 104.

The components involved in implementing the invention are at least:
- a network anonymization solution 104, which in practice is an overlay network "above" the conventional network 102;
- a trusted network or circle of trust (or "Trust ring") 106, consisting of a plurality N' of members $M_{N'}$ or partners wishing to exchange information with one another anonymously;
- a pool 108 of a plurality N of proxies $P_N$, operated by independent parties, and responsible for relaying information from a sender of the trusted network to the partners of the trusted network.

Optionally, one or more databases (202, 204) may be constructed and act as registers of proxies and partners, and define the membership of these partners in the various circles of trust (that is to say subgroups of the initial trusted network).

The databases (202, 204) are controlled by all of the members of the trusted network, who are therefore able to consult them, securely or not securely, at all times, either via the anonymization network 104 or directly via the conventional network 102. Indeed, both the pool of proxies 108 and the members of the trusted network 106 have network addresses (for example IP addresses) that are visible to all of the elements of the underlying traditional network 102.

In one preferred embodiment of the invention, the members and the proxies communicate with one another anonymously via the anonymization network 104. However, in the case of unidirectional communication, the connection of the proxies to the members of the trusted network may be carried out non-anonymously.

The partners of the trusted network 106 thus have access, at all times, to the list of proxies, to the list of other partners and the membership of these partners in the various possible circles of trust (subgroups). Since consulting these databases is commonplace for those skilled in the art, this is not detailed in the description.

In one embodiment, the databases (202, 204) are defined as routing tables, as illustrated in Tables I, II and III below.

The subgroups (or circles of trust) are defined in advance between the members of the trusted group. Each member then chooses the one or more circles of trust to which they wish to send information by selecting the relevant pairs (proxies, groups) according to the predefined routing tables.

In one practical embodiment, the user communicates a target group identifier to each selected proxy.

Table I illustrates the general make-up of groups $G_i$ (by agreement between the members $M_i$ of a trusted network) with, for each group, the list of proxies $P_i$ and members of the circle of trust $M_i$ who form part of this group. For example, the members $M_1$, $M_2$, $M_4$ belong to the group $G_1$, and they are able to relay their information via the proxies $P_1$, $P_2$ and $P_4$.

TABLE I

| Global | | |
|---|---|---|
| Groups $G_i$ | Proxies $P_i$ | Members $M_i$ |
| G1 | $P_1$ $P_2$ $P_4$ | $M_1$ $M_2$ $M_4$ |
| G2 | $P_2$ $P_3$ $P_4$ | $M_2$ $M_3$ $M_4$ |
| G3 | $P_1$ $P_2$ $P_3$ | $M_1$ $M_2$ $M_3$ |
| ... | ... | ... |

Table II illustrates the parameters of membership in a group, of corresponding proxies, and of a shared-secret function used by a member $M_1$ depending on their membership in a group. Thus, by way of example, during exchanges in the group $G_1$ (grouping together the members $M_1$, $M_2$, $M_4$ and the relays $P_1$, $P_2$, $P_4$ according to Table I), the shared-secret function used by $M_1$ is the XOR function. During exchanges in the group $G_3$, (grouping together the members $M_1$, $M_2$, $M_3$ and the relays $P_1$, $P_2$, $P_3$ according to Table I), the shared-secret function used by $M_1$ is the 'XOR with latency' function. In one embodiment of the invention, the shared-secret function might be defined by the members of the group during their initial exchanges and modified over time, periodically or non-periodically.

TABLE II

| $M_1$ | | |
|---|---|---|
| Groups | Proxies | Function F( ) |
| G1 | $P_1$ $P_2$ $P_4$ | XOR |
| G3 | $P_1$ $P_2$ $P_3$ | XOR + latency |
| ... | ... | ... |

Table III illustrates a proxy routing table indicating the group parameters $G_i$ and the members belonging to the respective group. For example, the proxy $P_4$ will relay information sent by a member of the group G2 to all of the members of this group, that is to say $M_2$, $M_3$ and $M_4$.

TABLE III

| Groups | Members |
|---|---|
| G1 | $M_1$ $M_2$ $M_4$ |
| G2 | $M_2$ $M_3$ $M_4$ |
| ... | ... |

Figure 3:
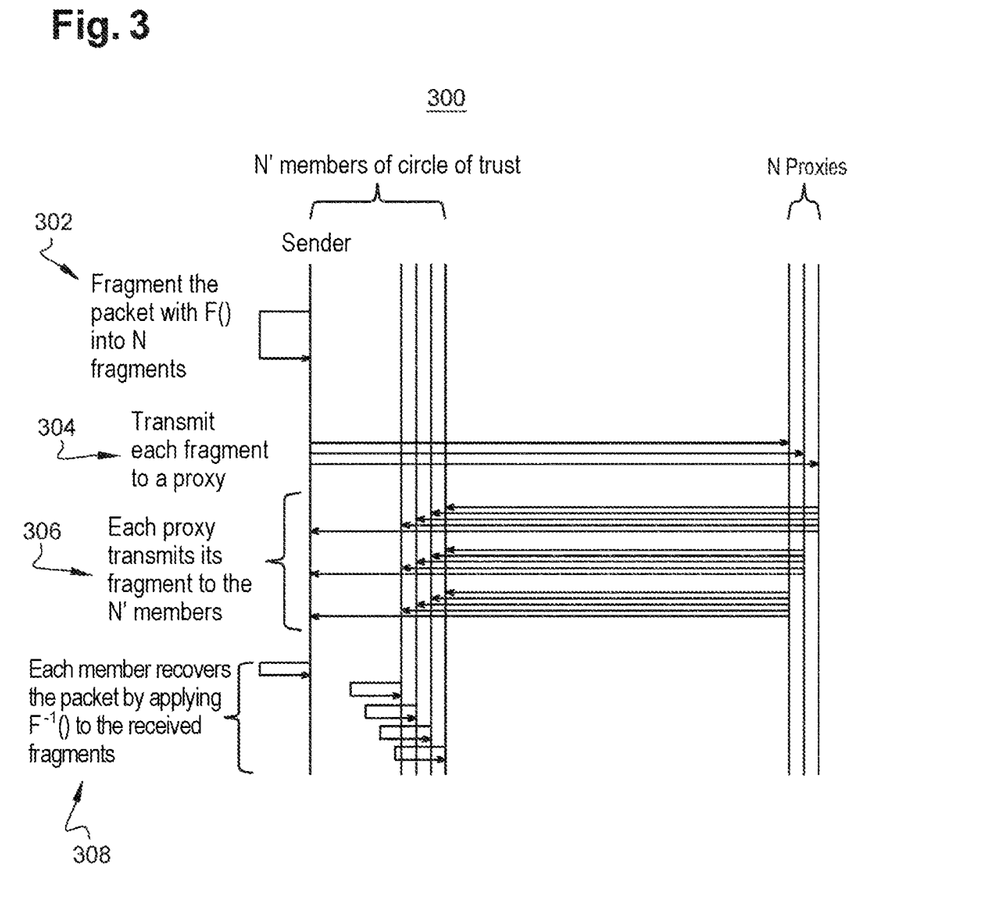
FIG. 3 is a flowchart of the anonymous transmission method of the invention, in a unidirectional point-to-multipoint embodiment.

FIG. 3 shows a flowchart 300 of the anonymous transmission method of the invention, in a unidirectional point-to-multipoint embodiment. The method starts when a member, for example '$M_1$', from a circle of trust $\{M_1, M_2, \ldots, M_{N'}\}$ wishes to transmit information "Data" anonymously to the members of the circle. The trusted network of partners 206 consists of at least three members (N'n).

In the remainder of the description, for reasons of simplification, the terms 'members', 'partners' and 'sender' denote physical entities and/or hardware and software means configured for these physical entities to implement any function that makes it possible, inter alia, to fragment, transmit, receive and reconstruct data via the anonymization network, in accordance with the steps of the method of the invention.

In a first step 302, the method allows the sender to fragment the information to be transmitted into a plurality N of fragments, and then, in a following step 304, the method allows the sender to transmit each generated fragment Ni to a proxy $P_i$ from the pool of proxies.

Figure 4A:
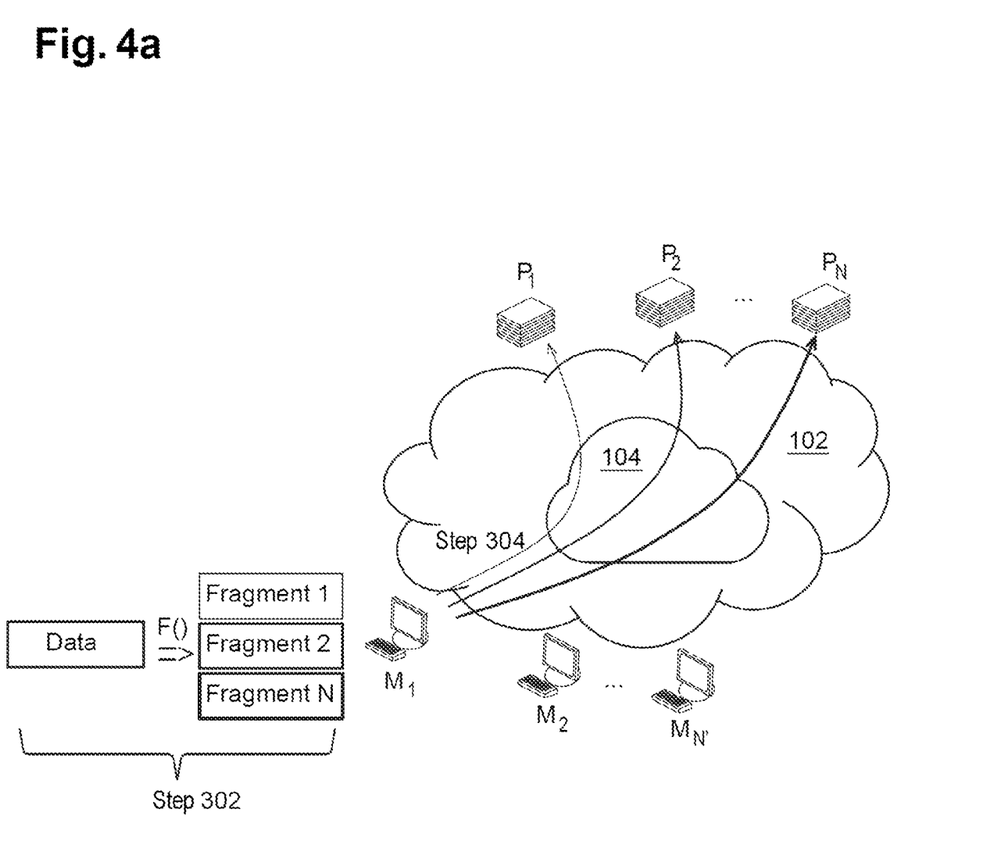

FIG. 4a illustrates steps 302 and 304 of the unidirectional anonymous transmission method of the flowchart of FIG. 3, on the exemplary architecture of FIG. 2.

Thus, in step 302, from a packet "Data", the sender $M_1$ generates N complementary fragments (Fragment 1, Fragment 2, . . . Fragment N) using a shared-secret function FO, such that recombining these N complementary fragments makes it possible to recover the initial packet "Data", able to be written using the following equation:

$$F^{-1}(\{\text{complementary fragment}_i\}_{i=1 \ldots N}) = \text{Data}).$$

In one embodiment, the sender defines the recipients or a trusted group for the information to be received.

In one embodiment, the shared-secret function F( ) may be an XOR (Γ). The sender $M_1$ generates N−1 random fragments of a length equal to the length of the packet "Data", and such that the last fragment is complementary and equal to:

$$\text{fragment}_N = (_{i=1, \ldots, N-1} \Gamma \text{random fragment}_i) \Gamma \text{Data}.$$

In the following step 304, the sender $M_i$ transmits each fragment to a different proxy via the anonymization network platform 104. Thus, it transmits the first fragment 'Fragment 1' to a first proxy, for example $P_1$, via an anonymous connection $M_1$–$P_1$; it transmits the second fragment 'Fragment 2' to a second proxy, for example $P_2$, via an anonymous connection $M_1$–$P_2$; etc. until the last fragment 'Fragment N' transmitted to an Nth proxy, for example $P_N$, via an anonymous connection $M_1$–$P_N$.

It should be noted that the anonymous connection $M_1$–$P_i$ established in order to transmit a fragment to a proxy $P_i$ may be established only during the period of the transmission of the fragment from the sender to the proxy, or then be maintained if a response is expected from the proxies Pi.

Step 304 thus allows each proxy $P_i$ to receive a random noise (that is to say a fragment) from an unknown member of the trusted network.

According to some variant embodiments, the number of proxies may be predefined or be defined by the sender before sending information.

The number of proxies making up the pool of proxies 108 is at least two proxies (N≥2).

The method continues with a step 306 in which each proxy that has received a complementary fragment retransmits this fragment, via the anonymization network platform, to all of the members of the trusted network (or to all of the members of a trusted network subgroup), and then with a step 308 in which each member who has received a plurality of fragments reconstructs the packet "Data" using the inverse shared-secret function $F^{-1}( )$.

According to some variant embodiments, the shared-secret function F( ) may be predefined for a circle of trust and therefore known to each member of the group; it may be defined by the sender and transmitted via the proxies with the complementary fragments, and relayed to the recipients in the retransmission step 306; it may also be defined according to the application for which the method of the invention is implemented.

Those skilled in the art, beyond the indicated example of an XOR function, may thus implement any other function for establishing a shared-secret functionality between partners.

Figure 4B:
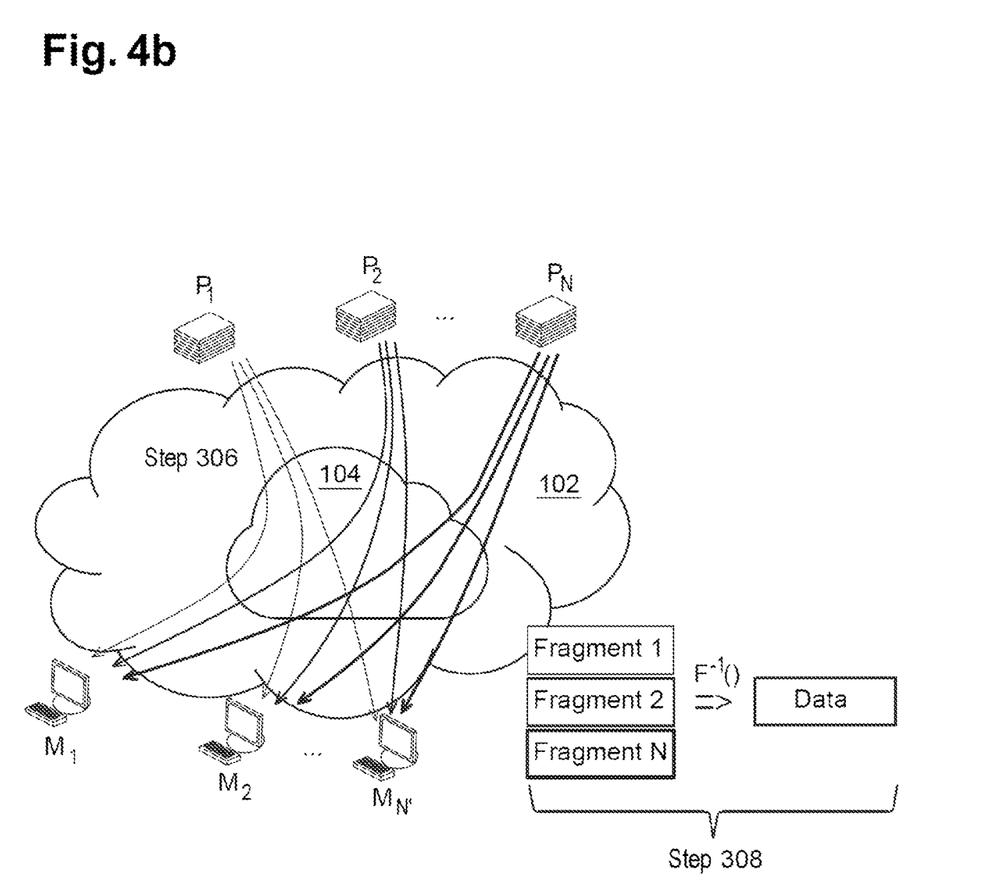
FIG. 4b illustrate the steps of the unidirectional anonymous transmission method of the flowchart of FIG. 3.

FIG. 4b illustrates steps 306 and 308 of the unidirectional anonymous transmission method of the flowchart of FIG. 3, on the exemplary architecture of FIG. 2.

Thus, in step 306, each proxy $P_i$ relays and retransmits, to all of the partners of the trusted network $\{Mi\}_{i=1, \ldots, N}$, the complementary fragment 'Fragment$_i$' that it received from the sender M1, via a previously established anonymous connection $M_1$–$R_i$.

It should be noted that the anonymous connection $P_i$–$M_i$ established in order to retransmit a fragment from a proxy $P_i$ to a recipient $M_i$ may be established only during the period of the transmission of the fragment from the proxy to this recipient, or then be maintained if a response is expected from the members of the circle of trust {Mi}.

When the members of the circle of trust have received the fragments sent by the proxies, the method allows, in step 308, each member of the network Mi to recombine all of the complementary fragments relayed by the pool of proxies {Pi}, via the inverse shared-secret function $F^{-1}( )$, and thus obtain the initial packet "Data" of the information that the sender wishes to share.

Figure 5A:
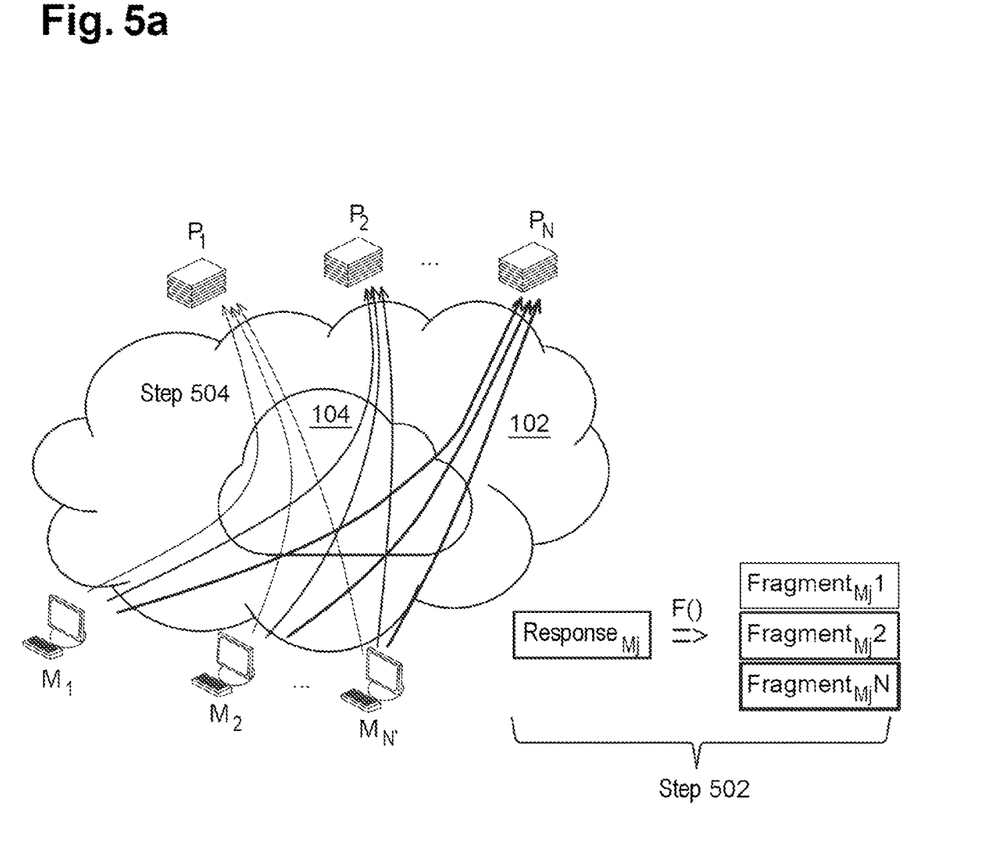
Figure 5B:
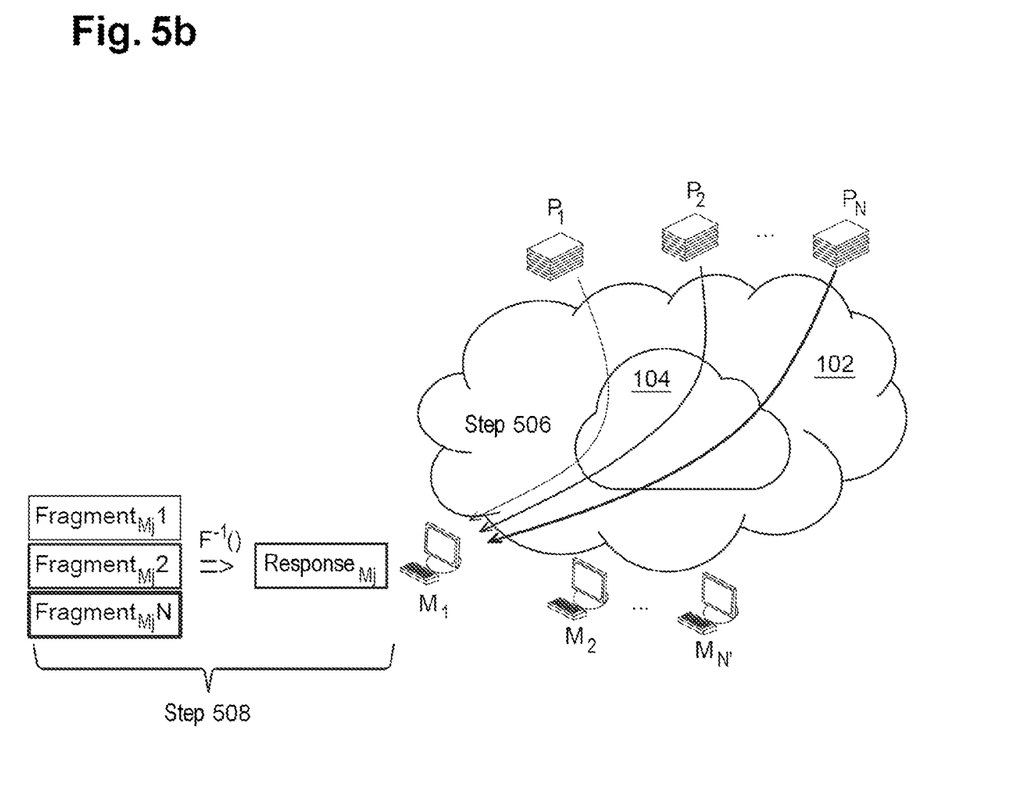
FIG. 5b illustrate the additional steps of the bidirectional anonymous exchange method according to one embodiment of the invention.
Figure 6:
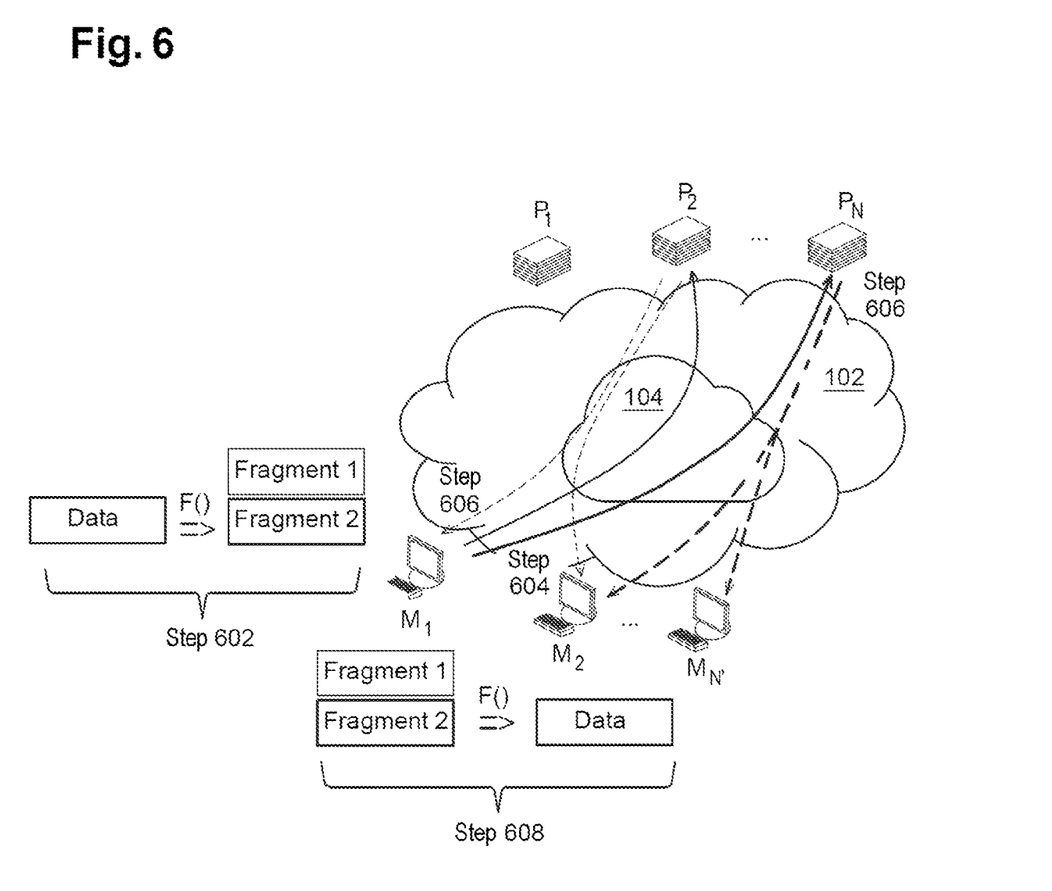
FIG. 6 illustrates one embodiment of the invention, referred to as "multi-circle"
Figure 7A:
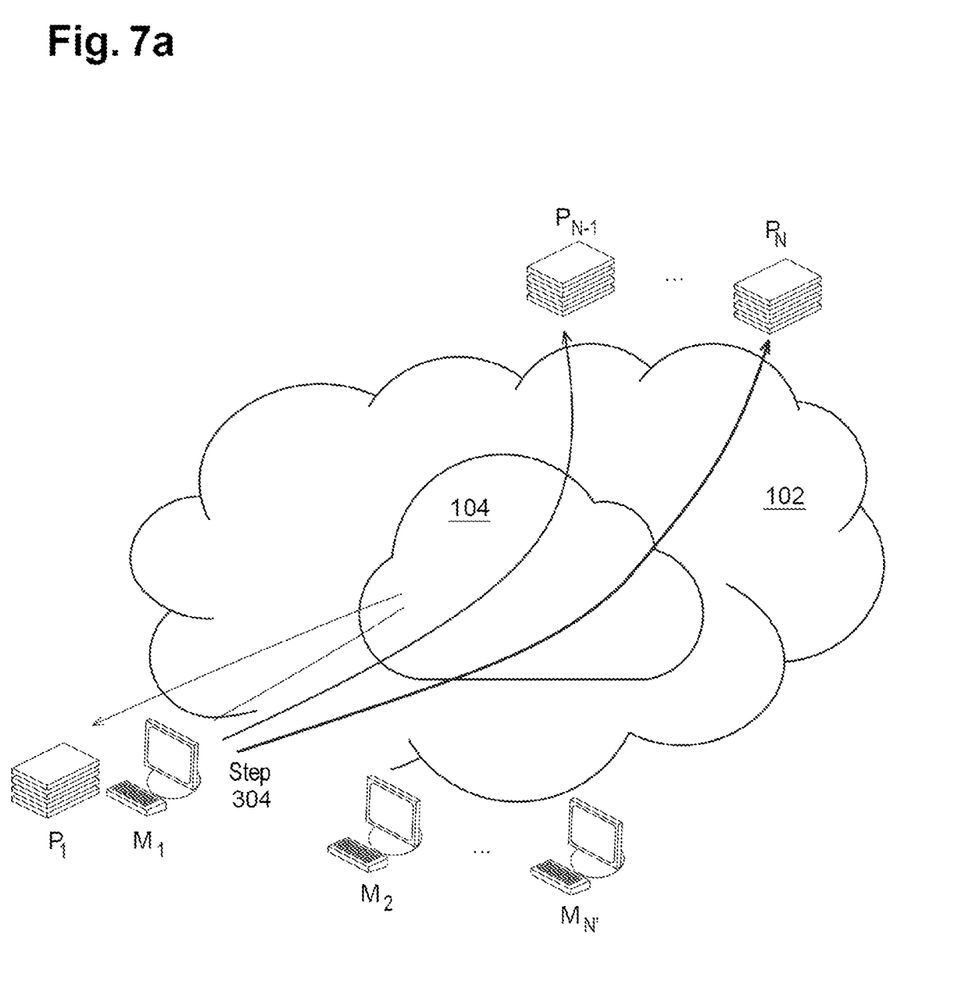
Figure 7B:
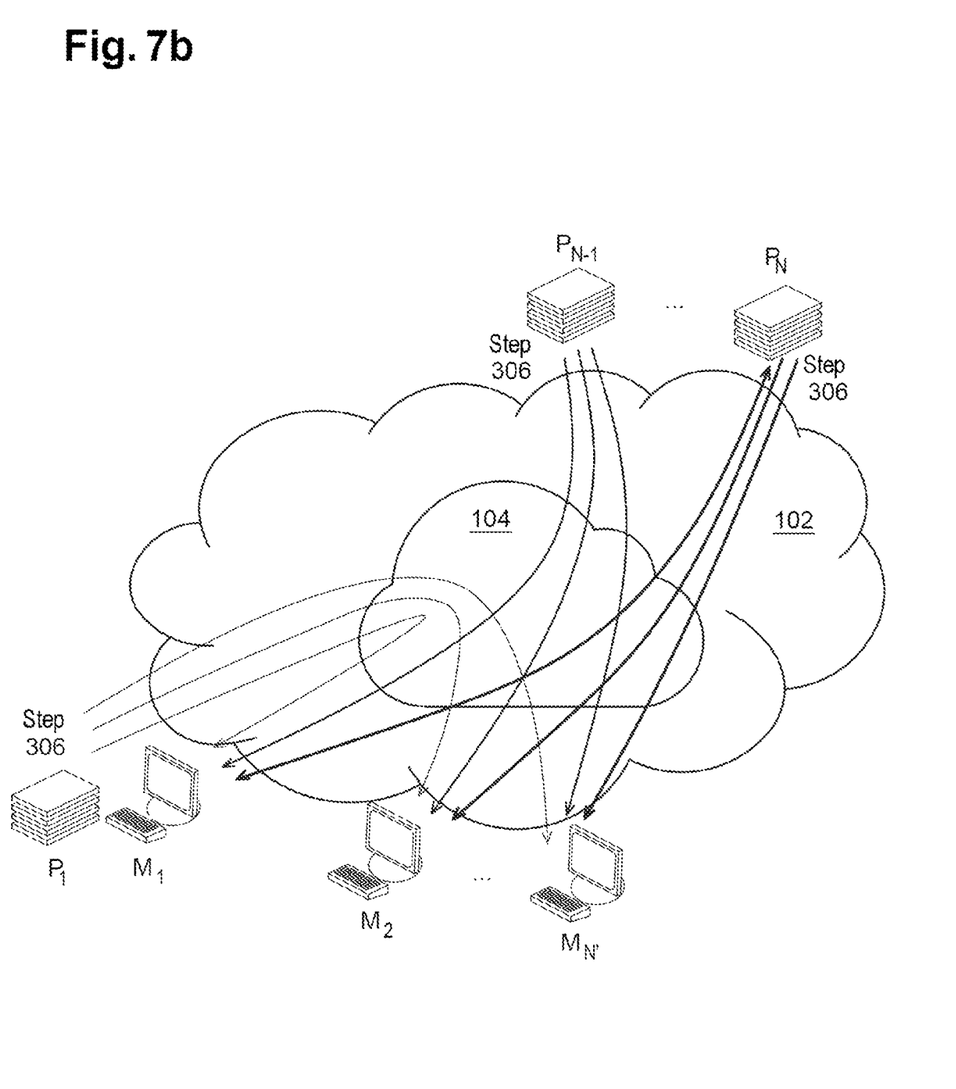
FIG. 7b illustrate one embodiment of the invention, referred to as "guarantee".

Some variant embodiments of the information exchange method of the invention are described according to FIGS. 5 to 7.

In one variant embodiment, the method of the invention is implemented for a bidirectional transmission between a sender $M_1$ and all of the members $\{M_i\}$ of a circle of trust to which the sender belongs, and involving a response from each of the $M_i$. Such a situation may for example be in the case where the information "Data" is an interrogation request on a specific database $BDD_i$ that is hosted by each $M_i$.

The method for this variant comprises the anonymous transmission steps 302 to 308 described above from a sender $M_1$. In this variant, the anonymous connections $M_1$–$P_i$ established in order to transmit a fragment to a proxy $P_i$ and the anonymous connections $P_i$–$M_j$ established in order to retransmit a fragment from a proxy $P_i$ to a recipient $M_j$ are maintained.

The method 300 additionally comprises steps in which each member of the circle of trust who has received the request from a sender who is unknown thereto will implement the same anonymous transmission mechanisms of the method of the invention in order in turn to anonymously send a response to the anonymous sender.

Thus, a member who sends "Response" information becomes a sender in the sense of the method 300 of the invention.

FIGS. 5a and 5b illustrate the sequence of steps of the bidirectional anonymous exchange method according to one embodiment of the invention.

A partner $M_j$ of a group who, after reconstructing a packet, has received a request calling for a response implements the anonymous transmission method. In a step 502, by applying the shared-secret function FO, they break down their "Response" data packet into a plurality N of complementary fragments (Fragment$_{Mj}$1, Fragment$_{Mj}$2, Fragment$_{Mj}$N) corresponding to the number of proxies, and then, in a step 504, transmit each fragment of this response to each proxy, via the anonymous connection Pi–Mj that was established previously by the proxy $P_i$ with the member $M_j$ and that has been maintained.

In a following step 506, each proxy retransmits the received fragment to the receiving member $M_1$ via the previously established anonymous connection $M_1$–$P_i$ that has been maintained. Next, in a following step 508 that is functionally similar to step 308, the receiving member $M_1$ applies the inverse shared-secret function $F^{-1}( )$ to the plurality of fragments Mj, in order to reconstruct the "Response" packet sent by the member $M_j$ of the circle of trust, who remains unknown thereto.

If simultaneous transmissions or exchanges might take place within the trusted network, the sender M1 may associate, with the complementary fragments i, a common identifier that it will have generated, and thus allow the recipients Mi to associate the correct fragments with one another.

In one variant embodiment of the invention, the retransmission, by the $P_i$ proxies, of the fragment i to the pool of recipients {Mi} may take place directly without passing through the anonymization network. However, in such a case, and also in the case where the transmission would also involve a response from each Mi, in order to guarantee the anonymity of the response, it is necessary for the application level to command that the transmission of these responses follows the principle of the invention (that is to say steps 302 to 308). This procedure is recommended in order to avoid potential analysis of the content thereof, typically reading of the size of the response in the case where "traffic flow confidentiality" techniques, such as "padding" for example, might not be able to be implemented.

One variant of the invention, referred to as "multi-circle" variant, is illustrated in FIG. 6. In this embodiment, one or several or all of the proxies have different retransmission rules, that is to say each one sends the fragment that it has received from a sender $M_1$ to a subset of the members $\{M_i\}$ of the circle of trust, which is specific to this sender (subset, of $\{M_i\}$). The retransmission rules may be pre-established by the members of the circle of trust. They may be centralized in the database of members 204 and proxies 202.

Thus, a sender $M_1$ may thus decide to send a packet "Data" only to a chosen subset of recipients, such that the receiving members of this subset consist only of the set of members who are at the intersection of the subsets of the chosen proxies. The members outside this intersection but who are included in certain subsets will then not receive all of the fragments, and will therefore not be able to recover the initial packet "Data".

Thus, advantageously, multiple circles of trust may be created, as illustrated in FIG. 6, in which the sender $M_1$ chooses to transmit a data packet "Data" on two complementary fragments (Fragment1, Fragment2), relayed by two proxies $P_2$ and $P_N$ (steps 602, 604).

According to the anonymized transmission method of the invention, the proxies $P_2$ and $P_N$ each retransmit the received fragments to a different subset of recipients. Thus, the proxy $P_2$ retransmits the fragment Fragment1 to the recipients $M_1$ and $M_2$, and the proxy $P_N$ retransmits the fragment Fragment2 to the recipients $M_2$ and $M_N$. As a result, with $M_2$ being the only one to receive the two complementary fragments (Fragment1, Fragment2), it is therefore the only one able to recombine them, according to the application principles of the inverse shared-secret function, and thus access the information "Data".

One variant of the invention, referred to as "Guarantee" variant, is illustrated in FIGS. 7a and 7b. In this embodiment, one or several or all of the proxies may be hosted by one or more of the partners of the trusted network. FIG. 7a more specifically illustrates step 304 of the method of the invention, in which the sender sends the complementary fragments of the data packet to all of the proxies including the one that it hosts and controls, and FIG. 7b more specifically illustrates step 306 of the method of the invention, in which each proxy, including the one hosted by the sender $M_1$, retransmits the received fragment to the members of the circle of trust.

In this configuration, partners who are in possession of a proxy have a guarantee, when they send or receive information passing through the proxy that they control, that no one outside the group of recipients identified by the sender is able to access (or modify) the information "Data", even in the event of collusion by all of the other members (or proxies) of the trusted network.

Another variant of the invention, referred to as "External protection" variant, consists in one or several or all of the partners of the circle of trust generating "noise", that is to say sending non-payload data or random fragments devoid of meaning, in order to drown out the payload data (the complementary fragments of a packet "Data" or "Response") in larger traffic. These useless data or fragments are recognized as noise by the application level. Advantageously, this makes it possible to prevent the proxies or an outside observer who might analyze the network flows and proxies from ascertaining whether or not the data being carried are payload data.

Such noise may be generated in at least two ways. In a first approach, the noise may be generated at the application level, that is to say at the level of the packets "Data", and therefore before the fragmentation by the shared-secret function FO. This is done by generating random or non-random content, which is marked by the protocol, and before fragmentation as non-payload content (for example via a particular bit in the protocol header). In another approach, the noise may be generated at the protocol level of the trusted network. This is done by randomly or non-randomly generating and sending a number of fragments less than the number N of proxies or the number of proxies required for the circle of trust under consideration (that is to say subset; of $\{Mi\}$). This generation may be pseudo-random or carried out using smart devices based on the current exchange flow, in response to a change in the flow in comparison with both total and payload traffic flows.

Another variant of the invention, referred to as "Mailbox" variant, consists in one or several or all of the partners of the circle of trust being able to choose to interrogate the proxies to which they have access in order to retrieve all of the fragments that they have the right to access. In this configuration, messages are not relayed automatically by the proxies. This mode may also be used when resuming a connection.

Another variant of the invention, referred to as "Storage" variant, consists in one or several or all of the proxies being able to store the fragments that they relay. These fragments then remain accessible to authorized partners.

Another variant of the invention, referred to as "Payment" variant, consists in the method of the invention being established between all of the members of a trusted network and a particular member who is in charge of access to the network. In this configuration, upon each flow transmission, the proxies relay the information to all of the members of the trusted network (as detailed by the method of the present invention) with a specific message notifying the transfer of data to the particular member in charge of access to the network, this message possibly including information relating to the performance of this transfer, such as for example information relating to the size, to the data rate, to the unidirectional or bidirectional nature of the packet, etc. This specific message may for example consist of the header of the payload message with a random noise instead of the fragment, thereby preventing the proxies from sending improper specific messages.

Advantageously, this variant makes it possible to define a way of deducing the objective cost of using the anonymization platform for the entire trusted network. Based on this, an invoice may be issued to all of the members of the trusted network, the trusted network being responsible for defining a method of distributing this charge, for example dividing the sum of the invoice by the number of members of the trusted network.

Another variant of the invention, referred to as "Reward" variant, consists in the exchanges being graded by all of the receivers of the information, on a basis that is defined by each of the trusted networks. Advantageously, such grading makes it possible to remunerate partners providing information deemed useful to the platform. The remuneration may be delegated to the various proxies. The remuneration may possibly be based on a cryptocurrency system.

Those skilled in the art will understand that the various variants of the invention—"Guarantee", "Multi-circle", "External protection", "Mailbox", "Storage", "Payment" and "Reward"—may be combined with one another so as to offer the whole spectrum of additional properties in a flexible manner.

A description has thus been given of a communication method, referred to as "anonymous multicast", and derived variants, which offer numerous advantages, namely:

allowing partners to build a trusted network in which these partners are able to transmit (unidirectional communication) or exchange (bidirectional communication) information with one another anonymously;

the fact that the transmission or the exchange is carried out without a trusted third party able to break anonymity and/or to access (or modify) the content of the transmission or the exchange;

building a trusted network consisting of one or a plurality of different circles of trust;

allowing a sender or initiator of an exchange to be the only one to control the level of trust that is used;

offering one or a plurality of members of the network a guarantee allowing them to verify that the information has actually been disseminated only to the members of the network, while preserving the anonymity of the sender;

allowing a sender, but also each of the receivers of a chosen circle of trust, to be able to verify for themselves that the content of the information has not been able to be intercepted or modified by a third party, and that there was not able to have been any collusion by the other members of the network against them. This offers the guarantee that the other members of the network have not been able to reconstruct a trusted third party;

guaranteeing that, during a transmission, only the members of the group of partners will receive the information and that, therefore, no third party outside the group is able to access this information. This means that there is no trusted third party able to break the anonymity of the sender of given information, and to access or modify this information independently of the level of protection (typically encryption) intrinsic to this information.

preventing the proxies and third parties outside the network from ascertaining whether payload content is sent or retrieved by one of the members of the network.

allowing the one or more receivers to qualify the information through a "degree of trust" while its sender is (and must remain) unknown. This degree of trust is deduced by the receiver by analyzing the proxies that relayed thereto the information defining this circle of trust;

allowing the members of a circle of trust to be able to individually obtain this guarantee, that is to say that a member does not need to trust the other members to benefit from this guarantee.

The invention claimed is:

1. A method for the anonymous transmission of information, the transmission being a point-to-multipoint communication or a multipoint-to-multipoint communication between members of one and the same trusted network, a trusted network being predefined by a plurality of members and a plurality of independent proxies, the communication within a trusted network taking place on an anonymization network platform that masks the IP addresses of the members of said trusted network, the method being computer-implemented and comprising steps of:

from a member of a trusted network, comprising N' members and N proxies, generating a plurality N of complementary data fragments, from an initial data packet, such that recombining the N complementary fragments makes it possible to reconstruct the initial data packet;

said sending member transmitting, via the anonymization network platform, each generated complementary fragment to an independent proxy from among the N proxies, respectively;

each independent proxy retransmitting, via the anonymization network platform, the complementary fragment received from said sending member to the plurality N' of members of the trusted network; and each receiving member of the trusted network recombining the plurality N of received complementary fragments in order to reconstruct the initial data packet.

2. The method as claimed in claim 1, comprising an initial step of defining, from among the plurality N' of members of the trusted network, at least three receiving members, and/or of defining, from among the plurality N of independent proxies, at least two proxies for relaying the transmission of the complementary fragments to the receiving members.

3. The method as claimed in claim 1, wherein the step of generating a plurality N of complementary fragments consists in applying a shared-secret function F( ) to said initial data packet, and the step of recombining the plurality N of received complementary fragments consists in applying the inverse shared-secret function $F^{-1}$( ) said complementary fragments.

4. The method as claimed in claim 3, wherein the shared-secret function is an XOR function with or without latency.

5. The method as claimed in claim 4, wherein the step of generating a plurality N of complementary fragments consists in generating N−1 random fragments of a length equal to the length of the initial data packet, and wherein the last fragment N is a fragment complementary to the previous ones.

6. The method as claimed in claim 2, wherein the initial step further comprises a step of defining a shared-secret function F( ) for a subset of the plurality N' of members of the trusted network.

7. The method as claimed in claim 6, wherein the step of the sending member transmitting the complementary fragments comprises, at the same time or sequentially, transmitting the shared-secret function to each proxy, or directly comprises the function of reassembly via the complementary fragments.

8. The method as claimed in claim 1, further comprising, after the recombination step, at least one receiving member of the trusted network implementing the generation, transmission, retransmission and recombination steps of claim 1 in order to send an anonymous response to said anonymous sending member.

9. The method as claimed in claim 1, wherein the retransmission step performed by the proxies consists in at least two proxies retransmitting their received complementary fragment to a subset of the plurality of receiving members.

10. The method as claimed in claim 1, wherein the step of transmitting the complementary fragments to the proxies consists in transmitting, in addition to the complementary fragments, data or random fragments devoid of meaning and recognized as noise at the application level.

11. The method as claimed in claim 1, further comprising, before the step of the proxies retransmitting the received complementary fragments, a step of the proxies storing said received complementary fragments.

12. The method as claimed in claim 1, wherein the step of the proxies retransmitting the complementary fragments further comprises a step consisting, for each proxy, in notifying the transmission of the complementary fragment to a member of the trusted network in charge of access to the anonymization network platform, said notification possibly being a message including information relating to the performance of the transmission, notably information relating to the size, to the data rate, and to the unidirectional or bidirectional nature of the data packet.

13. The method as claimed in claim 1, further comprising, after the fragment recombination step, a step of generating a grading of the received data packet.

14. The method as claimed in claim 1, wherein one, several or all of the proxies are hosted by one or more of the members of the trusted network.

15. A computer program product, said computer program comprising code instructions for carrying out the steps of the method as claimed in claim 1, when said program is executed on a computer.

16. A device for the anonymous transmission of information, the transmission being a point-to-multipoint communication or a multipoint-to-multipoint communication between members of one and the same trusted network, a trusted network being predefined by a plurality of members and a plurality of independent proxies, the communication within a trusted network taking place on an anonymization network platform that masks the IP addresses of the members of said trusted network, the device comprising means for implementing the steps of the method as claimed in claim 1.

* * * * *